US010749931B2

(12) United States Patent
Toumura et al.

(10) Patent No.: US 10,749,931 B2
(45) Date of Patent: Aug. 18, 2020

(54) DATA COLLECTION SYSTEM

(71) Applicant: HITACHI, LTD., Tokyo (JP)

(72) Inventors: Kunihiko Toumura, Tokyo (JP); Daisuke Ishii, Tokyo (JP); Yuji Ogata, Tokyo (JP)

(73) Assignee: HITACHI, LTD., Tokyo (JP)

( * ) Notice: Subject to any disclaimer, the term of this patent is extended or adjusted under 35 U.S.C. 154(b) by 83 days.

(21) Appl. No.: 16/131,233

(22) Filed: Sep. 14, 2018

(65) Prior Publication Data

US 2019/0289060 A1 Sep. 19, 2019

(30) Foreign Application Priority Data

Mar. 15, 2018 (JP) .................................. 2018-048108

(51) Int. Cl.
*H04L 29/08* (2006.01)
*G06F 16/26* (2019.01)
*G06F 16/28* (2019.01)

(52) U.S. Cl.
CPC .............. *H04L 67/06* (2013.01); *G06F 16/26* (2019.01); *G06F 16/288* (2019.01)

(58) Field of Classification Search
CPC ..... G06F 9/54; G06F 3/04817; G06Q 20/227; G06Q 30/0643; H04L 51/046; H04L 51/36; H04L 65/4053
USPC ....................................................... 709/204
See application file for complete search history.

(56) References Cited

U.S. PATENT DOCUMENTS

| 9,681,111 | B1* | 6/2017 | Newman | H04N 21/4524 |
|---|---|---|---|---|
| 2007/0182818 | A1* | 8/2007 | Buehler | G08B 13/19602 |
| | | | | 348/143 |
| 2007/0192351 | A1* | 8/2007 | Liu | G06F 16/86 |
| 2007/0282665 | A1* | 12/2007 | Buehler | G06Q 30/02 |
| | | | | 705/7.29 |
| 2012/0330952 | A1* | 12/2012 | Kong | G06F 16/7867 |
| | | | | 707/737 |
| 2013/0166711 | A1* | 6/2013 | Wang | H04N 7/181 |
| | | | | 709/223 |
| 2013/0208124 | A1* | 8/2013 | Boghossian | G06K 9/3241 |
| | | | | 348/159 |

(Continued)

FOREIGN PATENT DOCUMENTS

JP 2004-185456 A 7/2004
JP 2008-252410 A 10/2008

*Primary Examiner* — James E Springer
(74) *Attorney, Agent, or Firm* — Baker Botts L.L.P.

(57) ABSTRACT

A data collection system is configured with a management apparatus to define associations between data and metadata, design a method of displaying the data and the metadata related to the data, and generate methods of transmitting, receiving, and relaying the data and the metadata; a generation apparatus that generates the data and the metadata; a display apparatus that displays the data and the metadata; and a relay apparatus that relays the data and the metadata, the management apparatus distributing processing procedures related to the data and the metadata to be displayed on the display apparatus to one of or all of the generation apparatus, the relay apparatus, and the display apparatus, in accordance with a position of the data and an acquisition method contained in association information created using the function to design the associations.

9 Claims, 11 Drawing Sheets

(56) References Cited

U.S. PATENT DOCUMENTS

2014/0044113 A1\* 2/2014 Chu ..................... H04W 48/16
                                                    370/338
2016/0212504 A1\* 7/2016 Meng ............... H04N 21/21805
2017/0034483 A1\* 2/2017 Aghdasi ................ H04N 7/181

\* cited by examiner

FIG.3

ASSOCIATION TABLE 1031

103

| # | INPUT 301 | OUTPUT 302 | RETRIEVABLE POSITION 303 | RETRIEVAL DESTINATION 304 | INPUT TEMPLATE 305 | INQUIRY TEMPLATE 306 | REPLY TEMPLATE 307 | OUTPUT TEMPLATE 308 |
|---|---|---|---|---|---|---|---|---|
| 1 | PROCESS ID | OPERATOR ID | EDGE | DB1 | {"process ID":$1} | {"process ID":$1, "output": "operator"} | {"result":$2} | {"operator":$2} |
| 2 | (PROCESS ID, OPERATOR ID) | WORKER NAME | CENTER | DB2 | {"process ID":$3, "operator ID":$1} | {"process":$3, "worker": $1} | {"name": $2, "age": "_"} | {"worker name": $2} |
| 3 | WORKER NAME | OPERATOR NAME | - | - | {"worker name": $1} | - | - | {"operator name":$1} |
| 4 | - | (PROCESS ID, PROCESS 1 VIDEO) | PROCESS 1 CAMERA | - | - | - | - | {"process ID",0001} |
| .. | ... | ... | ... | ... | ... | ... | ... | ... |

GRAPHICAL EXPRESSION OF TABLE ABOVE

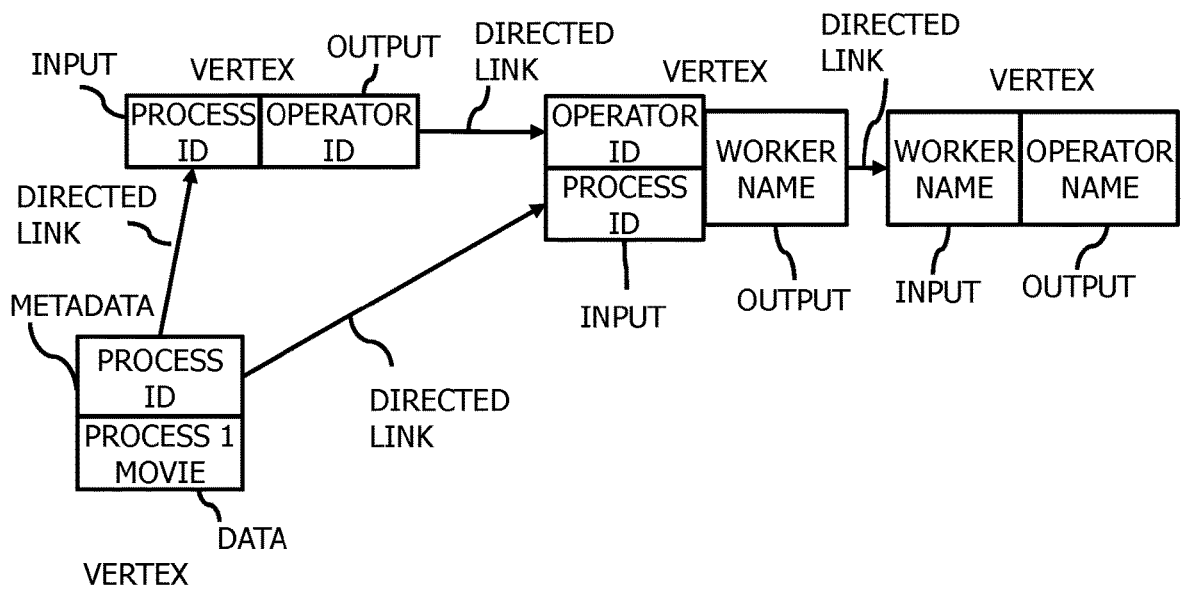

(OPERATIONS DURING DEPLOYMENT)

(OPERATIONS PERFORMED BY RELAY APPARATUS)

(METADATA ALLOCATION PROCEDURE TABLE)

| INPUT 602 | LATEST VALUE 603 | RETRIEVAL DESTINATION 604 | INPUT TEMPLATE 605 | INQUIRY TEMPLATE 606 | REPLY TEMPLATE 607 | OUTPUT TEMPLATE 608 |
|---|---|---|---|---|---|---|
| PROCESS ID | 101 | DB1 | {"process ID":$1} | {"process ID":$1, "output": "operator"} | {"result":$2} | {"operator" :$2} |

FIG. 7
(EXAMPLE OF PACKET FORMAT)
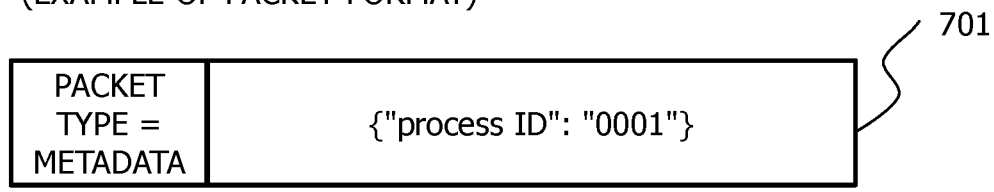

(EXAMPLE OF PACKET CONVERSION)

DATA COLLECTION SYSTEM

CROSS-REFERENCE TO RELATED APPLICATIONS

The present application claims priority to Japanese Patent Application No. 2018-048108, filed Mar. 15, 2018. The contents of this application are incorporated herein by reference in their entirety.

TECHNICAL FIELD

The present invention relates to a data collection system.

BACKGROUND ART

With the growth of network technology, collection of information (data) in a sensor, a camera, a database, and the like connected to a network, and visualization, analysis, and control of the collected information (data) have been widely pursued. On a factory line, for example, for the purpose of real time monitoring, improved production efficiency and quality control, it is necessary to analyze not only structured data such as sensor information and semi-structured data such as device logs but also unstructured data such as an image and a video.

Since the unstructured data such as an image and a video is larger than the structured data in a data volume per entry, it is necessary to adopt transmission/storage schemes for the unstructured data different from those for the structured data. For example, as for the structured data, which is several kilobytes in size per entry, a system that facilitates retrieving the structural data can be constructed by transmitting the structured data as one message on message-oriented middleware, storing the structured data in a relational DB as one record in one entry, and adding an appropriate index to the structured data. However, the unstructured data such as a video is several megabytes to several gigabytes per entry; thus, a method of transmitting the unstructured data by file transfer and storing the unstructured data in a file system, or the like is employed. Alternatively, the video is distributed in a stream type and a concept of "one entry" is not often present at all for the unstructured data; thus, the need arises to determine whether to display the video as it is or to convert the video into files at an appropriate magnitude on a receiving side. It has been necessary to construct a system handling a combination of the unstructured data and the structural data in compliance with requirements of each site on an as-needed basis.

Since the unstructured data and the structured data exhibit different characteristics from each other, fixing data to be collected per application such as a data analysis application and constructing a system dedicated to the application have been widely pursued.

These systems enable a user to easily perform data analysis by associating metadata with the collected data. For example, associating information about an object to be photographed, that is, metadata with video data obtained by photographing the object by a camera makes it possible to display the metadata about the object together with the video and to present the video easier to understand for a viewer.

Examples of such systems include techniques described in JP-2004-185456-A (Patent Document 1) and JP-2008-252410-A (Patent Document 2).

Patent Document 1 describes the following technique. "A communication system for receiving, interpreting, and converting metadata is disposed between communication terminals. Contents can be quickly provided by changing only the metadata without changing the very contents. In addition, an optimum content is selected by referring to various pieces of information such as viewer attribute information, client type information, and advertisement attribute information. The communication system is easily operated by providing a mechanism for selecting, registering, and changing an advertisement insertion policy by an advertiser or an advertisement distribution business operator, a mechanism for automatically determining an advertisement insertion point into the contents, and a mechanism for registering an advertisement attribute." In this way, Patent Document 1 discloses a method of selecting the optimum content for a receiving side by disposing the communication system that converts meta-information between a transmitting side of transmitting the contents containing metadata and the receiving side.

Furthermore, Patent Document 2 describes the following technique. "When a user designates an object on a screen by an object designation section 26 of a content display apparatus 14, identification information about the object and status data about a video content at this time are transmitted to an information providing server 12. A candidate selector 32 of the information providing server 12 performs retrieval in a reference frequency storage section 40 on the basis of the status data, and selects metadata to be displayed in accordance with points indicative of a weight of a display frequency preset in response to a status and display restrictions. A display information transmitter 36 reads the metadata to be displayed from a metadata storage section 18, and transmits the metadata to the content display apparatus 14." In this way, Patent Document 2 discloses a method of selecting appropriate metadata from the information providing server in response to identification information about the object when the object is designated in the screen through which a viewer is viewing the video, and transmitting the metadata to the content display apparatus.

PRIOR ART DOCUMENTS

Patent Documents

Patent Document 1: JP-2004-185456-A
Patent Document 2: JP-2008-252410-A

SUMMARY OF THE INVENTION

Problem to be Solved by the Invention

The technique of Patent Document 1 exhibits effects that dynamically converting the metadata enables further addition of a value to the information presented to the viewer and that optimum contents and advertisements can be delivered and interactive contents and advertisements can be delivered by utilizing delivery conditions, the latest attribute information about the viewer, and the client's type information. Furthermore, the technique of Patent Document 2 exhibits an effect that the information (metadata) about the object can be displayed in the video content. However, an object to which the metadata is allocated and a data set that can be allocated as the metadata change over time. For example, as for a use case for monitoring in a factory, contents of processes frequently change and metadata to be allocated, therefore, eventually changes. Moreover, in a case of deployment of a new metadata generation source, it is necessary to configure a new display method using the generation source.

In such a case, the metadata displayed for a data user cannot be freely selected with the methods disclosed in Patent Documents 1 and 2 since a metadata generation method and a metadata acquisition destination are fixed.

Owing to this, in a case of the need of a new data utilization method, it is necessary to construct a metadata allocation system on an as-needed basis. In that case, however, it is necessary to design procedures for generating information allocated as the metadata such as a position and a method at and by which the information necessary to allocate the metadata can be retrieved and to construct a system, thus producing a problem that prompt response to use cases cannot be ensured.

Therefore, in the light of the problems described above, an object of the present invention is to provide a technique capable of easily constructing procedures for creating information necessary to allocate metadata, easily accomplishing construction/expansion of a system, for example, that collects information in a sensor, a camera, and a database connected to a network and that performs visualization, analysis, and control, and capable of facilitating responding to diverse use cases by utilizing association information designed previously.

Means for Solving the Problem

To solve the above problems, a representative data collection system of the present invention is configured with: a management apparatus that has an association design function to define and design associations between data and metadata, a design function to design a method of displaying the data and the metadata to be displayed on the data and related to the data, and a function to generate methods of transmitting, receiving, and relaying the data and the metadata from information given from the two design functions; a generation apparatus that generates the data and the metadata; a display apparatus that displays the data and the metadata; and a relay apparatus that relays the data and the metadata. The management apparatus includes a function to construct processing procedures, which include a generation procedure for generating the data and the metadata, a metadata allocation procedure for allocating the metadata to the data, a relay procedure for relaying the data and the metadata, and a display procedure for displaying the data and the metadata, in accordance with a position of the data and an acquisition method contained in the association information created using the association design function, and to distribute the generation procedure to one or more generation apparatuses, distribute the relay procedure to one or more relay apparatuses, and distribute the display procedure to one or more display apparatuses, in accordance with a position of the data and an acquisition method contained in the association information created using the association design function. The generation apparatus includes a function to transmit the data to the display apparatus via the relay apparatus on the basis of the generation procedure distributed from the management apparatus. The relay apparatus includes a function to inquire of the generation apparatus about the metadata on the basis of the relay procedure distributed from the management apparatus, using the data or the metadata received from the generation apparatus, and on the basis of an acquisition procedure contained in the relay procedure, and to generate new metadata, and the display apparatus includes a function to display the data or the metadata received from the relay apparatus on the basis of the display procedure distributed from the management apparatus.

Effect of the Invention

According to the present invention, the system that collects information in a sensor, a database, and the like connected to a network and that performs visualization, analysis, and control becomes easy to construct and expand. Furthermore, utilizing previously designed association information facilitates responding to diverse use cases.

Objects, configurations, and advantages other than those describe above are readily apparent from the description of embodiments given below.

BRIEF DESCRIPTION OF THE DRAWINGS

FIG. 3 illustrates an association table that indicates an example of definition of associations and a graph that is the table graphically expressed according to the first embodiment.

FIG. 7 is a diagram illustrating an example of a packet format for data transfer according to the first embodiment.

MODES FOR CARRYING OUT THE INVENTION

Embodiments of the present invention will be described hereinafter with reference to the drawings.

While the following embodiments are described on the premise that means for storing each pieces of information is a table, the information may be expressed by a data structure other than the table. Furthermore, each program is executed by a processor, which is, for example, an MP (microprocessor), a CPU, or a microcontroller, and performs a specified process.

First Embodiment

In the present embodiment, an example of a system for enabling creation of a user interface through which it is possible to refer to a video of each process on a factory line taken by a camera in real time and to refer to metadata compatible with a current status of the process together with the video thereof will be described.

Figure 1:
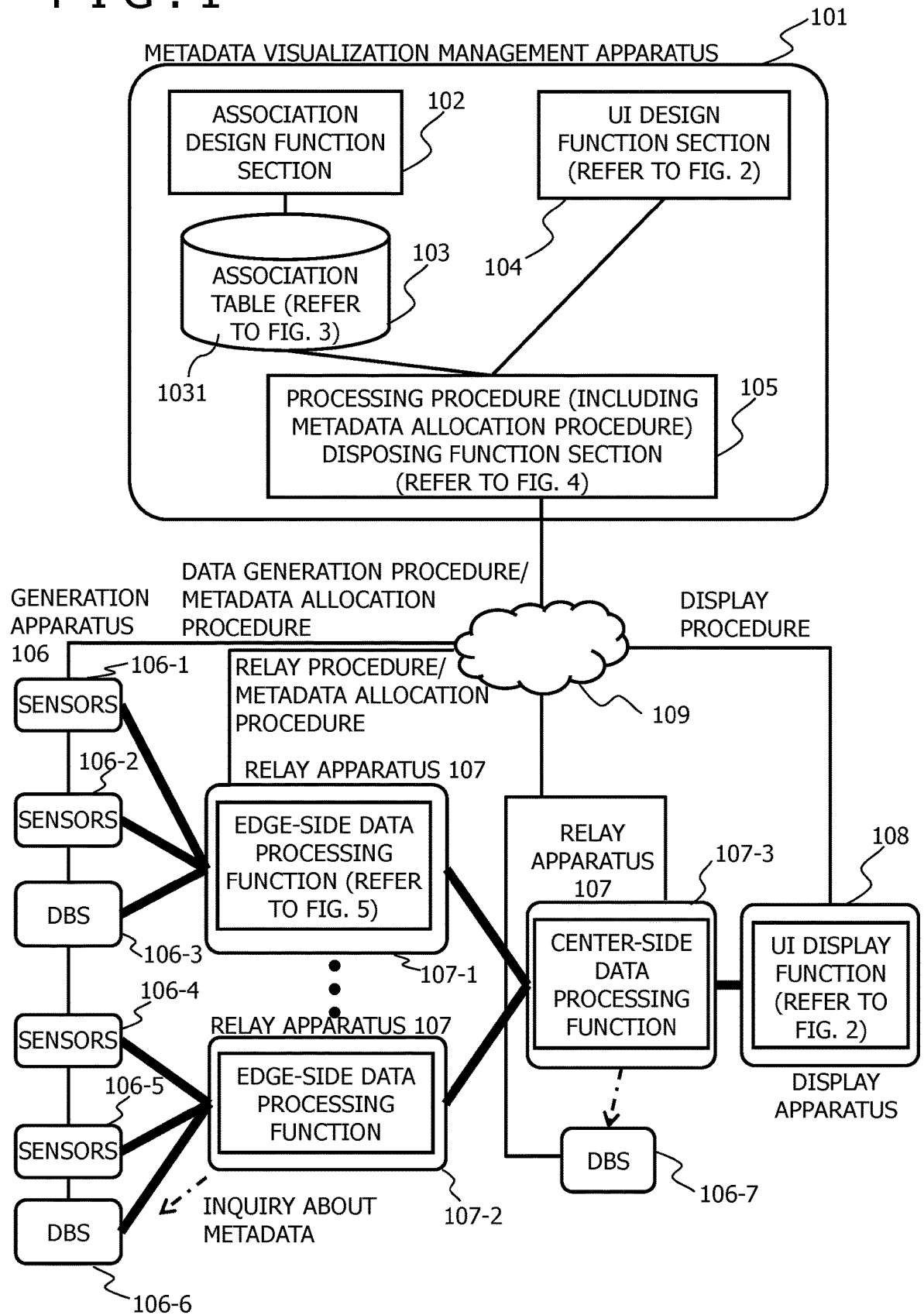
FIG. 1 is a block diagram illustrating an example of a configuration of a data collection system according to a first embodiment of the present invention.

FIG. 1 is a block diagram illustrating an example of a configuration of a data collection system according to the present invention.

The data collection system has a metadata visualization management apparatus 101, generation apparatuses 106 (106-1 to 106-6) generating data including a video, relay apparatuses 107 (107-1 to 107-7) configured with multiple stages such that data and metadata are received from the generation apparatuses 106 and relayed to a rear stage, and a display apparatus 108 that receives the data and the metadata from the relay apparatuses 107 and displays the data and the metadata.

The metadata visualization management apparatus 101, the generation apparatuses 106, the relay apparatuses 107, and the display apparatus 108 are connected to one another via a management network 109. Furthermore, the generation apparatuses 106, the relay apparatuses 107, and the display apparatus 108 are connected to one another for transmission of the data and the metadata.

A connection relationship among these apparatuses is a logical relationship and an arbitrary physical connection relationship can be held.

The generation apparatuses 106 are apparatuses generating original data and the metadata displayed on the display apparatus 108, and include a plurality of sensors 106-1, 106-2, 106-4, and 106-5 and a plurality of DBs (databases) 106-3 and 106-6. The sensors include a camera.

The relay apparatuses 107 include relay apparatuses 107-1 and 107-2 installed on an edge side of the generation apparatuses 106 and a relay apparatus 107-3 installed on a center side, and each of the relay apparatuses 107-1 to 107-3 has a data processing function to relay the data and the metadata. The relay apparatus 107-3 is connected to the DBs 106-7.

The display apparatus 108 has a UI display function to display the data relayed by way of the relay apparatuses 107 and the metadata allocated to the data.

The metadata visualization management apparatus 101 has an association design function section 102, a UI design function section 104, a metadata allocation procedure disposing function section 105, and an association table storage section 103 that stores an association table 1031, and is configured from a computer that executes, for example, a program for executing an association design function, a program for executing a US design function, and a metadata allocation procedure disposing function program.

The association design function section 102 has a function to define associations between a plurality of pieces of information (data), that is, associations between the data and the metadata. For example, the association design function section 102 has the association design function to design the associations such as an input and an output for a metadata allocation procedure, a position of an apparatus which is an object to be retrieved and which can execute the metadata allocation procedure, a retrieval destination from which the data is acquired in the metadata allocation procedure, an input template that indicates a procedure for extracting a necessary part from data used as the input for the metadata allocation procedure, an inquiry template that indicates a procedure for generating an inquiry at a time of inquiring of the retrieval destination, a reply template that indicates a procedure for extracting, from the retrieval destination, a necessary part from among a reply to the inquiry, and an output template that indicates a form of the new metadata from the input and the reply to the inquiry, and stores the associations described using the association design function 102 in the association table storage section 103. Specific examples of association information (data) will be described later with reference to FIG. 3.

The association design function section 102 designs the associations by reading and writing information (data) from and to the association table 1031 (refer to FIG. 3).

Figure 2:
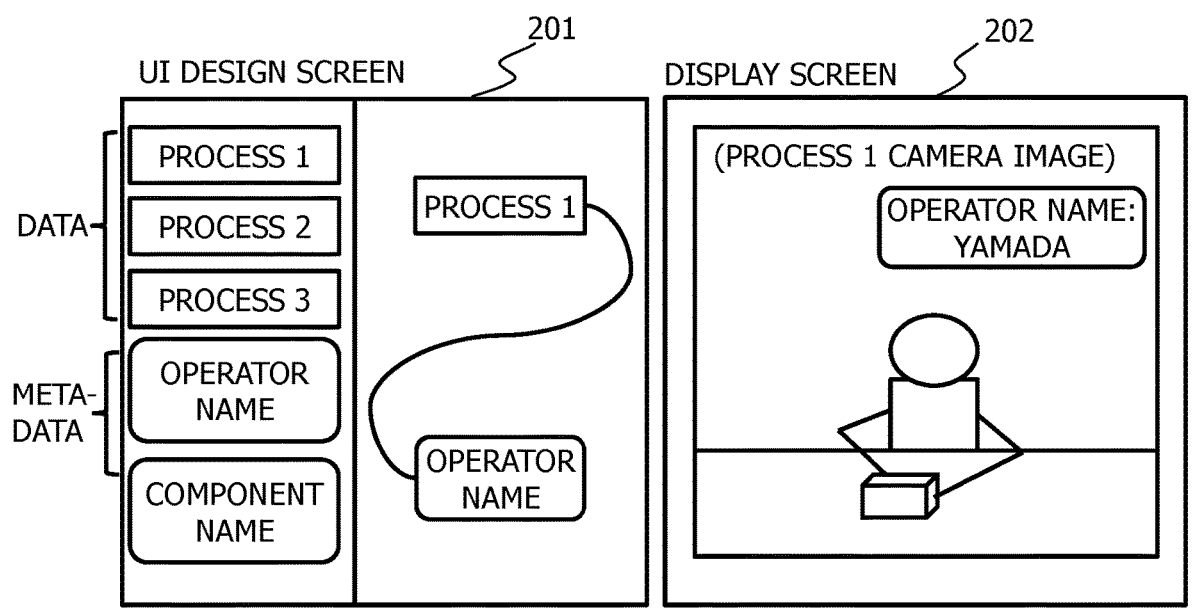
FIG. 2 is a diagram illustrating an example of a screen of a user interface in a UI design function of a metadata visualization apparatus according to the first embodiment.

The UI design function section 104 has a UI design function to designate the metadata (operator name) to be displayed with respect to the data generated by the generation apparatuses 106, for example, a camera image (video) in a process 1 (refer to FIG. 2).

The metadata allocation procedure disposing function section 105 has a metadata allocation procedure disposing function to construct processing procedures that include a procedure for generating the data (data generation procedure), a procedure for allocating the metadata to the data (metadata allocation procedure), a procedure for determining a transmission path of the data and the metadata and relaying the data and the metadata (relay procedure), and a procedure for displaying the data and the metadata (display procedure), and that is related to the data and the metadata on the basis of the association information (refer to FIG. 3) stored in the association table 1031 of the association storage section 103 and UI design information (refer to FIG. 2) designed by the UI design function section 104, and to distribute and dispose the metadata allocation procedure to the generation apparatuses 106, the relay apparatuses 107, and the display apparatus 108.

The display apparatus 108 has a UI display function to display the data relayed by way of the relay apparatuses 107 in accordance with the display procedure distributed from the metadata visualization management apparatus 101.

The generation apparatuses 106 include, for example, the plurality of sensors 106-1, 106-2, 106-4, and 106-5 and the plurality of DBs (databases) 106-3 and 106-6 generating the data. The sensors include the camera, and the sensors are apparatuses each of which generates the data (including the metadata and the video) that forms basis of the data displayed on the display apparatus 108, and which transmits the generated data to the display apparatus 108 via the relay apparatuses 107.

Examples of a data transmission method include a method of returning, from each generation apparatus 106, a result in response to a request from each relay apparatus 107, a method of transmitting an event, which is to be transmitted to the relay apparatus 107 from the generation apparatus 106 in a case of occurrence of the event, and a method of transmitting generated information represented by a video stream on a regular basis.

The relay apparatuses 107 include the relay apparatuses 107-1 and 107-2 disposed on the edge side of the generation apparatuses 106 and the relay apparatus 107-3 disposed on the center side, and the relay apparatuses 107 are apparatuses each of which receives the data from the generation apparatuses 106 or another relay apparatus 107 or the metadata from the DBs 106-3, 106-6, and 106-7, and the like, allocates the metadata to the data in accordance with the metadata allocation procedure given to the relay apparatus 107 from the metadata visualization management apparatus 101 in advance, and yet transmits the data to which the metadata is allocated to another relay apparatus 107 or the display apparatus 108.

The center-side relay apparatus 107-3 is connected to the DBs 106-7 storing the data.

The display apparatus 108 displays the data relayed by way of the relay apparatuses 107 in accordance with the display procedure given to the display apparatus 108 from the metadata allocation procedure disposing function section 105 of the metadata visualization management apparatus 101 in advance, and visualizes the data.

It is assumed herein that restrictions are put on the other generation apparatuses 106 and the other relay apparatuses 107 accessible from each generation apparatus 106 and each relay apparatus 107. Owing to this, the metadata allocation procedure executable by one certain relay apparatus 107 is configured only with data reception or inquiries from the generation apparatuses 106 and the relay apparatuses 107 accessible from the certain relay apparatus 107.

FIG. 2 is a diagram schematically illustrating an example of a UI design screen of the UI design function section 104 of the metadata visualization management apparatus 101 and of a display screen of the display apparatus 108.

On the UI design screen 201 of the UI design function section 104, the data (processes 1 to 3) and the metadata (operator name, component names) related to the data are designated as a content to be displayed. In the present example, an example of designating "operator name" as the metadata related to the "process 1" for the video data about "process 1" is illustrated.

A display screen 202 illustrates an example of a screen of the display apparatus 108 designed on the UI design screen 201 of the UI design function section 104.

FIG. 3 is a diagram illustrating an example of a configuration of the association table 1031 in the metadata visualization management apparatus 101, and a diagram graphically expressing information in the association table 1031.

The association table 1031 has the metadata allocation procedure as each entry, and holds information such as an input 301, an output 302, a retrievable position 303, a retrieval destination 304, an input template 305, an inquiry template 306, a reply template 307, an output template 308 described hereinafter.

The input 301 indicates a type (a process ID, an operator ID, and/or a worker name) of data that could serve as an input of the metadata allocation procedure.

The output 302 indicates a type (the operator ID, an operator name, a worker name, or the process ID, or process 1 video) of data that serves as an output of the metadata allocation procedure.

For example, in a case in which the association design function section 102 describes "process ID" in the input 301 and "operator ID" in the output 302, it is indicated that the type of the input of the metadata allocation procedure is the process ID, a value of the operator ID is generated from a value of the process ID by a procedure of some sort, and the value can be allocated as the metadata.

Further, an entry without designation in the input 301 indicates a procedure capable of generating the data or the metadata irrespectively of the input 301. This is used to indicate the metadata allocation procedure in the generation apparatus 106 that generates information about the camera, the sensor, or the like.

Moreover, in a case of describing a plurality of types, for example, "process ID, operator ID" in the input 301, it is indicated that all of those types of inputs are necessary in the metadata allocation procedure executed in the entry.

In a case of describing a plurality of types, for example, "process ID, process 1 video" in the output 302, it is indicated that all of those types of metadata are newly generated when the generation is compliant with the metadata allocation procedure executed in the entry.

The retrievable position 303 indicates a position (an edge, a center, or a process 1 camera) of the apparatus that can execute the metadata allocation procedure indicated in the entry.

It is assumed that the apparatuses configuring the system illustrated in the present embodiment are disposed at specific positions, and names indicating the positions or position sets are allocated to the apparatuses, respectively.

Describing one of the names in the retrievable position 303 restricts the position at which the metadata allocation procedure indicated by the entry can be executed.

The retrieval destination 304 indicates the name (DB1 or DB2) of the apparatus or a URL thereof from which the data is acquired in the metadata allocation procedure.

The input template 305 indicates a procedure for extracting a necessary part from the data used as the input of the metadata allocation procedure ("{"process ID": $1}", "{"process ID": $3, "operator ID":$1}", or "{"worker name":$1}").

For example, description of "{"process ID": $1}" of the input template 305 represents a procedure for extracting "0001" from the input "{"process ID":0001}" so that the metadata can be referred to by a temporary name of "$1".

It is assumed hereinafter that a similar description scheme is used in the templates of the present embodiment.

It is noted that description of a method of extracting necessary data from the input and description of the form of the data to be output explained herein are given as an example and the description scheme is not limited to this scheme.

The inquiry template 306 indicates a procedure for generating an inquiry at a time of inquiring about data of the retrieval destination indicated in the retrieval destination 304 ("{"process ID":$1, "output":"operator"}" or "{"process": $3, "worker":$1}"). The reply template 307 indicates a procedure for extracting a necessary part from a reply to the inquiry at the retrieval destination indicated in the retrieval destination 304 ("{"result":$2}" or "{"name":$2, "age": "_"}").

The output template 308 indicates a form of metadata newly generated from the input and the reply to the inquiry ("{"operator":$2}", "{"worker name":$2}", "{"operator": $1}", or "{"process ID":0001}").

Graphical expression of the associations described in the association table 1031 illustrated in FIG. 3 is illustrated on a lower side of FIG. 3.

This graph is expressed such that each entry of the association table 1031 is defined as the vertex of the graph and that the entries in which the input 301 is equal to the output 301 in element are connected to each other by a directed link as illustrated on the lower side of FIG. 3.

The allocation procedure of the metadata allocation procedure disposing function section 105, to be described later, is the allocation procedure (refer to FIG. 6) generated to be executed by the generation apparatuses 106, the relay apparatuses 107, and the display apparatus 108 on the basis of this graphical expression.

Figure 4:
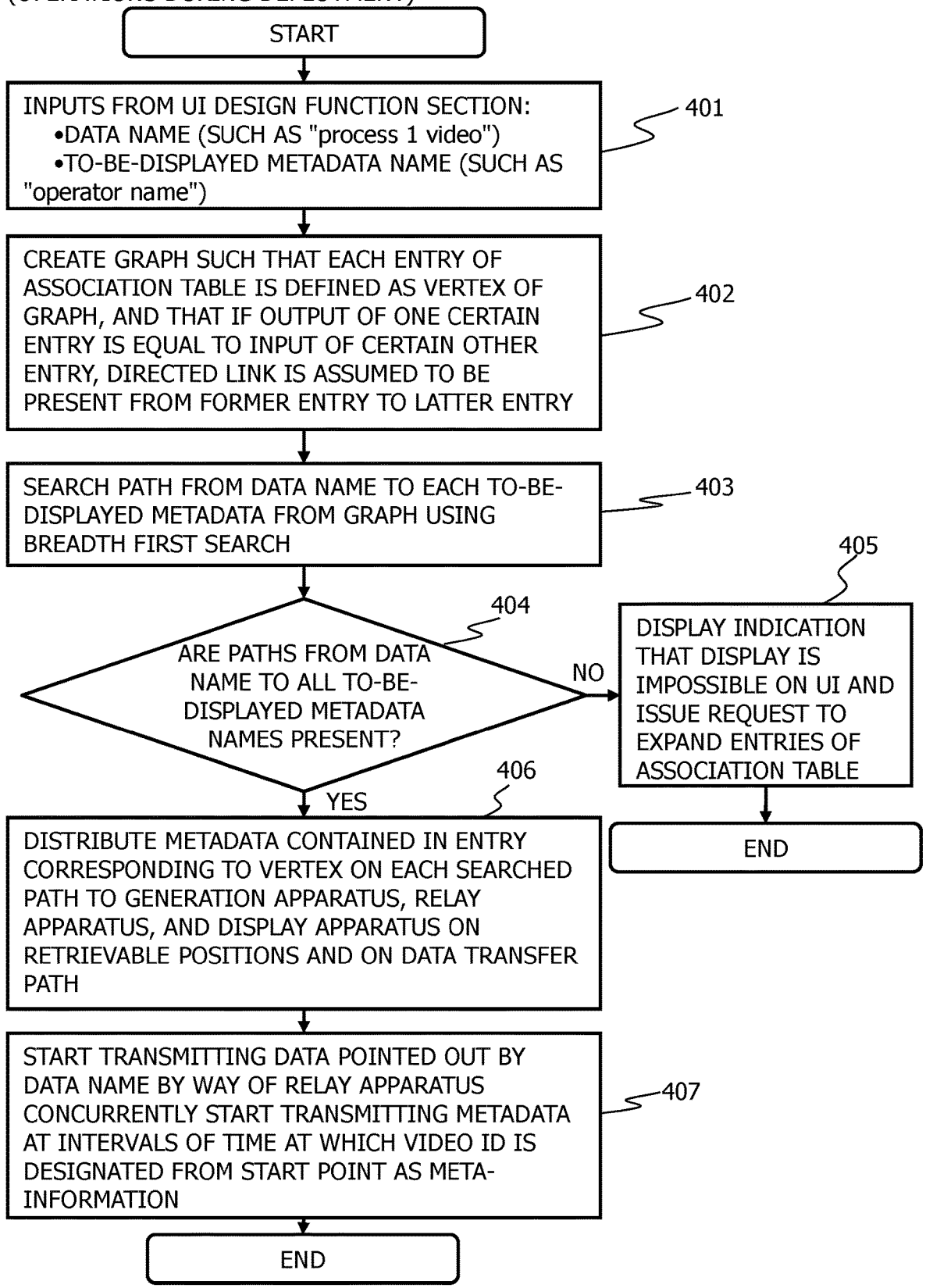
FIG. 4 is a flowchart illustrating processes for creating and distributing a data creation procedure, a data relay procedure, and a data display procedure according to the first embodiment.

FIG. 4 is a flowchart for describing operations performed by the metadata allocation procedure disposing function section 105 during disposing of the metadata allocation procedure.

The operations based on the flowchart of FIG. 4 are as follows.

Step 401:

First, the metadata allocation procedure disposing function section 105 operates with input of, for example, a data name (such as "process 1 video") and a name of the metadata (such as "operator name") displayed along with the data as information described by the UI design function section 104 as a trigger.

Step 402:

Next, the metadata allocation procedure disposing function section 105 creates the graph as illustrated in FIG. 3 in such a manner that the entries of the association table 1031 are defined as the vertexes of the graph (the process ID and the process 1 video of FIG. 3; the process ID and the operator ID of FIG. 3; the operator ID of FIG. 3, process ID of FIG. 3, and the Worker name of FIG. 3; and Worker name and the operator name of FIG. 3), and that if part of the output 302 (for example, the process ID, the process ID video of FIG. 3) of one certain entry (#1 of FIG. 3) is equal to part of the input 301 (the process ID of FIG. 3) of the other certain entry (#4 of FIG. 3), the directed link is assumed to be present from the former entry (#1) to the latter entry (#4).

The graph created here may be created in advance since the graph may be updated only when there is a change in the association table 1031. Furthermore, the information in the association table 103 may be stored in a storage device such as a graph database dedicated to graph computation and a function owned by the graph database may be used at a time of search of the retrieval destination to be described later.

Step 403:

Next, the metadata allocation procedure disposing function section 105 searches the vertex of the graph which has no input and but has the output of the same type as that of the data name, from the graph created in Step 402. In other words, a path from the data name to each of the to-be-displayed metadata is searched using a breadth first search from the graph, and a search is performed to confirm whether the path arriving at the vertex having the output of the same type as that of the to-be-displayed metadata name by tracking the directed link from the vertex is present.

Step 404:

The metadata allocation procedure disposing function section 105 confirms whether paths from the data name to all the to-be-displayed metadata names are present as a result of the search in Step 403.

If no path is present (No), the metadata allocation procedure disposing function section 105 goes to Step S405, and if the paths for all the metadata are present (Yes), the metadata allocation procedure disposing function section 105 goes to Step 406.

Step 405:

If no path is present (No), the necessary metadata cannot be associated with the data; thus, the metadata allocation procedure disposing function section 105 displays an indication that display is impossible on the UI design screen 201 using the UI design function section 104, and issues a request to expand entries of the association table.

Step 406:

If the paths for all the metadata are present (Yes), the metadata allocation procedure disposing function section 105 extracts the entries that serve as the vertexes on the paths from the association table 1031, and confirms the generation apparatuses 106 transmitting the data and the relay apparatuses 107 through which the data goes from the display apparatus 108 displaying the data.

Next, the metadata allocation procedure disposing function section 105 distributes the metadata allocation procedure described in each entry to the generation apparatuses 106, the relay apparatuses 107, and the display apparatus 108 under the restrictions described in the entries extracted from the association table 1031 as the retrievable positions 303. In other words, the metadata allocation procedure disposing function section 105 distributes the metadata contained in the entries corresponding to the vertexes on each searched path to the generation apparatuses 106, the relay apparatuses 107, and the display apparatus 108 on the retrievable positions and on a data transfer path.

Step 407:

Lastly, the metadata allocation procedure disposing function section 105 requests each generation apparatus 106 generating the data pointed out by the data name to start generating the data on the basis of the corresponding entry in the association table 1031.

Through these procedures, the procedures for data generation and metadata allocation are distributed to the generation apparatuses 106, the relay apparatuses 107, and the display apparatus 108, and the associated metadata is allocated to the data in proportion to the start of transmission of the data.

Figure 5:
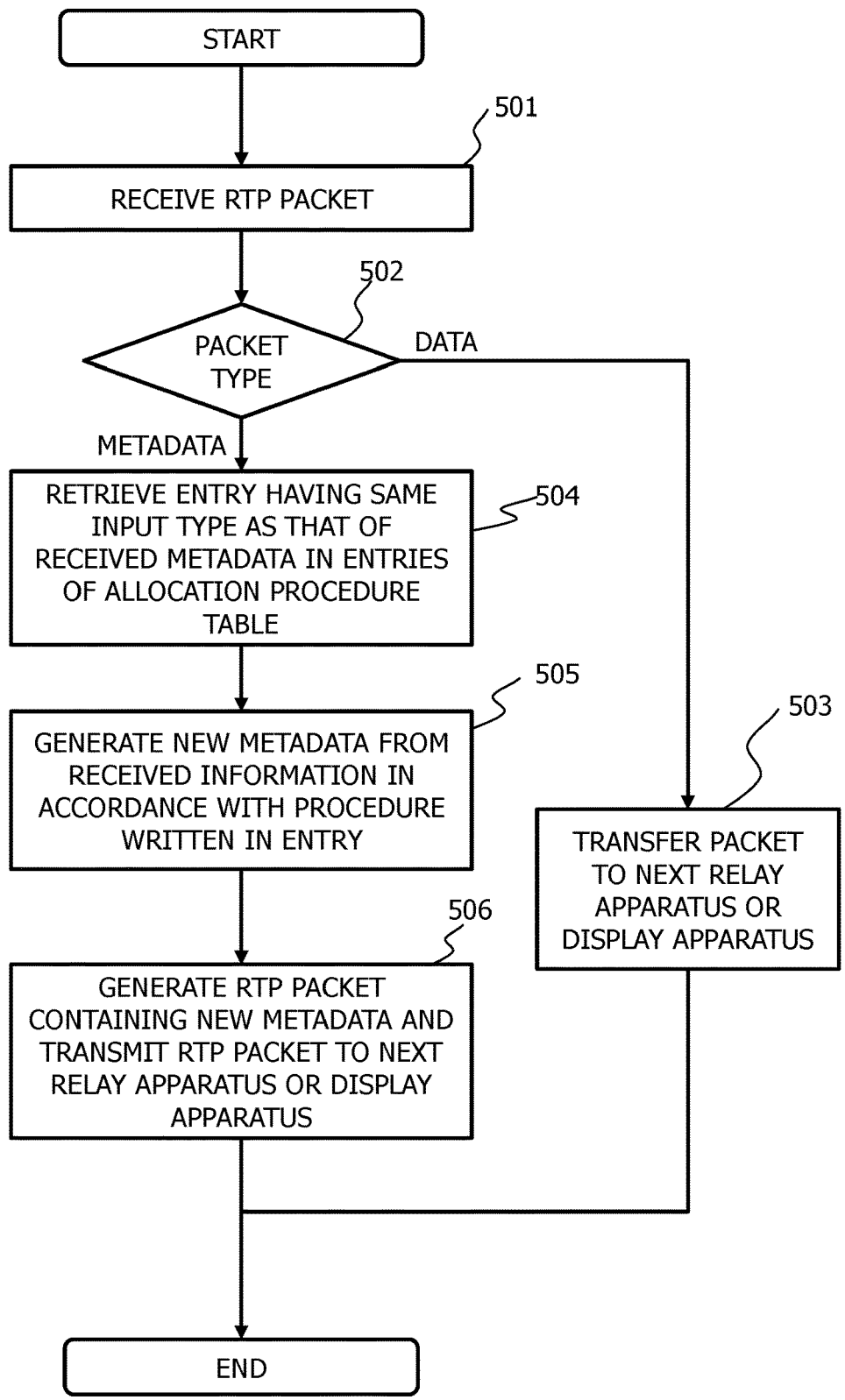
FIG. 5 is a flowchart illustrating operations performed by relay apparatuses according to the first embodiment.

FIG. 5 is a flowchart for describing operations performed by the relay apparatus 107 at a time of receiving data to be relayed.

In the present example, the operations are described on the assumption that the data and the metadata are transferred in accordance with an RTP (Real-time Transport Protocol).

The RTP is a protocol normally used to transfer streams of video, audio, and the like. Allocating an RTP packet containing the metadata to a series of RTP streams enables allocation of the metadata to video data.

Operations based on the flowchart of FIG. 5 are as follows.

Step 501:

Each relay apparatus 107 waits for an RTP packet from either the generation apparatus 106 or another relay apparatus 107. The relay apparatus 107 receives the RTP packet in Step 501.

Step 502:

Next, the relay apparatus 107 checks on a type of the RTP packet. Since an item for describing the type of data contained in payload of the RTP packet is present in a header part of the RTP packet, it is assumed in the present example that the relay apparatus 107 classifies the type of the RTP packet using this information.

If the type of the packet is data in Step 502, the relay apparatus 107 goes to Step 503, and if the type of the packet is metadata, the relay apparatus 107 goes to Step 504.

Step 503:

The relay apparatus 107 transfers the received packet to the next relay apparatus 107 or the display apparatus 108.

Step 504:

If the type of the packet is metadata, the relay apparatus 107 searches the entry having the same type of the input as the type of the received metadata in the entries of a metadata allocation procedure table 601 (FIG. 6 to be described later) created on the basis of the information received from the metadata visualization management apparatus 101 by referring to the metadata allocation procedure table.

Step 505:

Next, the relay apparatus 107 inquires of the retrieval destination 304 in accordance with the procedure described in the entry, that is, the retrieval destination 304 contained in the searched entry and the inquiry template 306, extracts necessary information from the metadata, and generates new metadata from information received from the retrieval destination.

Figure 6:
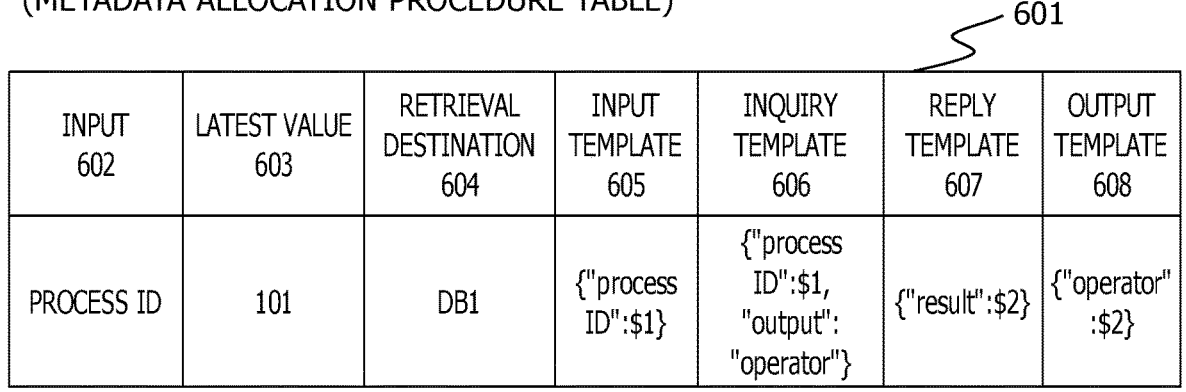
FIG. 6 is an allocation procedure table illustrating an example of the relay procedure distributed to the relay apparatuses according to the first embodiment.

If a plurality of values are necessary as the input 301 in Step 505, the relay apparatus 107 inquires of the retrieval destination 304 on the basis of the latest values recorded in the allocation procedure table 601 of FIG. 6. In addition, the relay apparatus 107 updates the allocation procedure table 601 with the received metadata as the latest value.

Step 506:

Lastly, the relay apparatus 107 generates an RIP packet containing the newly generated metadata, and transmits the generated RTP packet together with the received RTP packet to the next relay apparatus 107 or the display apparatus 108.

FIG. 6 is a diagram illustrating an example of a data configuration of the allocation procedure table 601 held in the DB 106-1 by the relay apparatus 107.

Each entry of the allocation procedure table 601 holds such information as an input 602, a latest value 603, a retrieval destination 604, an input template 605, an inquiry template 606, a reply template 607, and an output template 608 to be described below.

The input 602 indicates the type ("process ID") of metadata which is an object in the present entry out of the received metadata.

The latest value 604 indicates a value ("101") of the metadata compatible with the input 602 of the entry and received last.

The retrieval destination 603 indicates the name ("DB1") of the apparatus or the URL thereof from which the data is acquired in the metadata allocation procedure.

The input template 605 indicates the procedure for extracting the necessary part from the data used as the input of the metadata allocation procedure ("{"process ID":$1}").

The inquiry template 606 indicates the procedure for generating the inquiry at the time of inquiring of the retrieval destination indicated in the retrieval destination 604 ("{"process ID":$1}", "output":"operator"})").

The reply template 607 indicates a procedure for inquiring of the retrieval destination indicated in the retrieval destination 604 on the basis of the inquiry template 606, and extracting a necessary part from a reply to the inquiry ("{"result":$2}").

The output template 608 indicates the form of the newly generated metadata from the input and the reply to the inquiry ("{"operator":$2}").

FIG. 7 is a diagram illustrating an example of a packet format of data.

In a metadata packet 701, an example in which a value "0001" of the "process ID" type is stored as the metadata is illustrated. In addition, a data packet 702 illustrates an example of a packet in which video data is stored.

Figure 8:
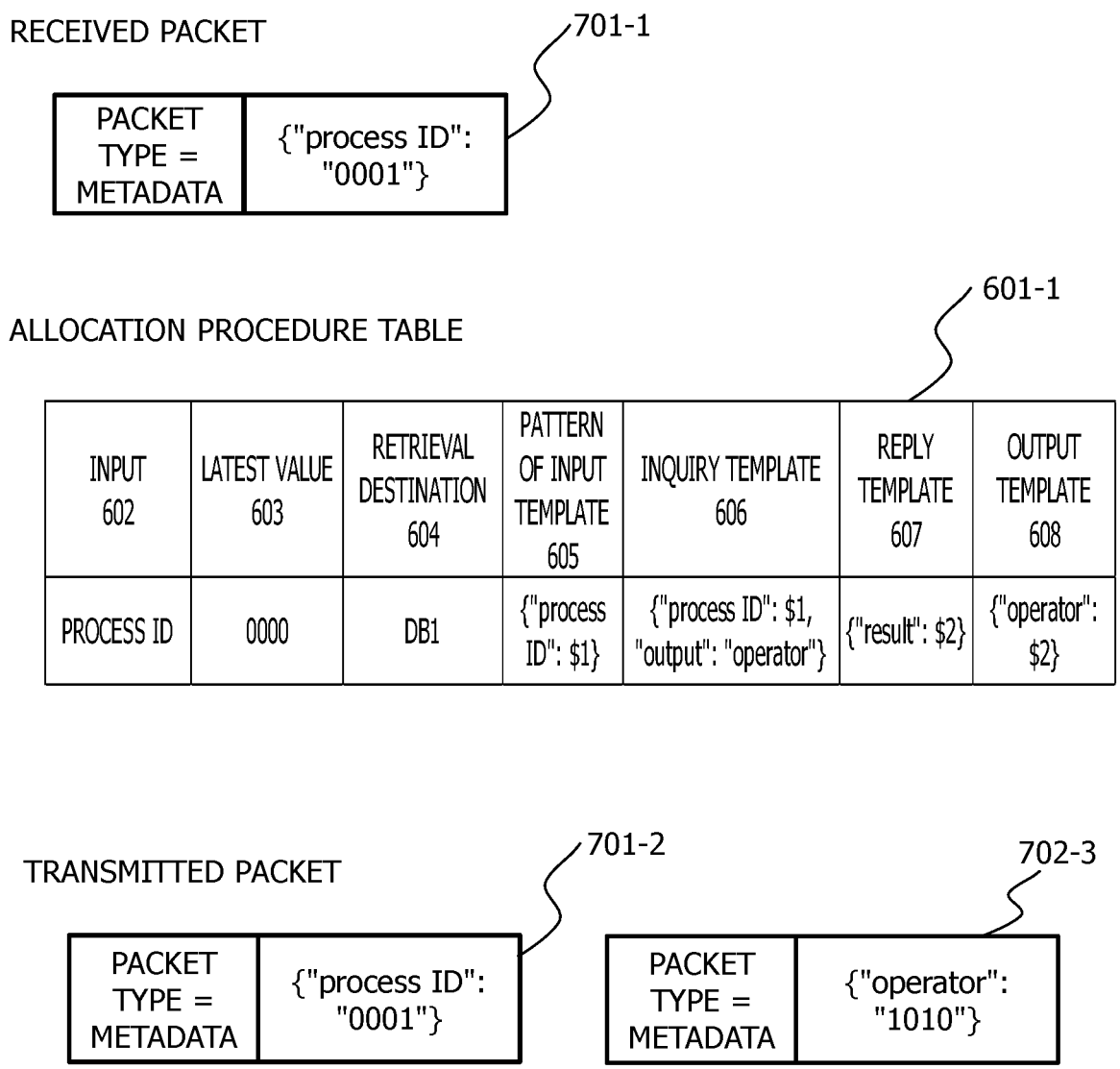
FIG. 8 is a diagram illustrating an example of packet conversion according to the relay procedure according to the first embodiment.

Operations performed by the relay apparatus 107 will now be described using specific values described in FIG. 8.

It is assumed that an allocation procedure table 601-1 is stored in the DBs 106-7 of the relay apparatus 107. It is assumed that this relay apparatus 107 received a received packet 701-1, that is, metadata packet.

The relay apparatus 107 retrieves an entry having the same type as that of the metadata by referring to the allocation procedure table 601-1.

Next, the relay apparatus 107 extracts the latest value "0001" of the process ID from the received packet 701-1 in accordance with a pattern of the input template 605 of the matching entry.

Next, the relay apparatus 107 transmits "{"process ID": 0001, "output": "operator"}" to the "DB1" in the retrieval destination 604 as a content of the inquiry in accordance with a content of the inquiry template 606.

The retrieval destination 604 replies to the inquiry with a retrieval result in a format of "{"result":1010}".

The relay apparatus 107 receiving this reply extracts a result "1010" in accordance with the reply template 607. The relay apparatus 107 generates the new metadata "{"operator":"1010"}" in accordance with the output template 608, and transmits the new metadata to the next relay apparatus 107 or the display apparatus 108 as a transmitted packet 702-3.

Figure 9:
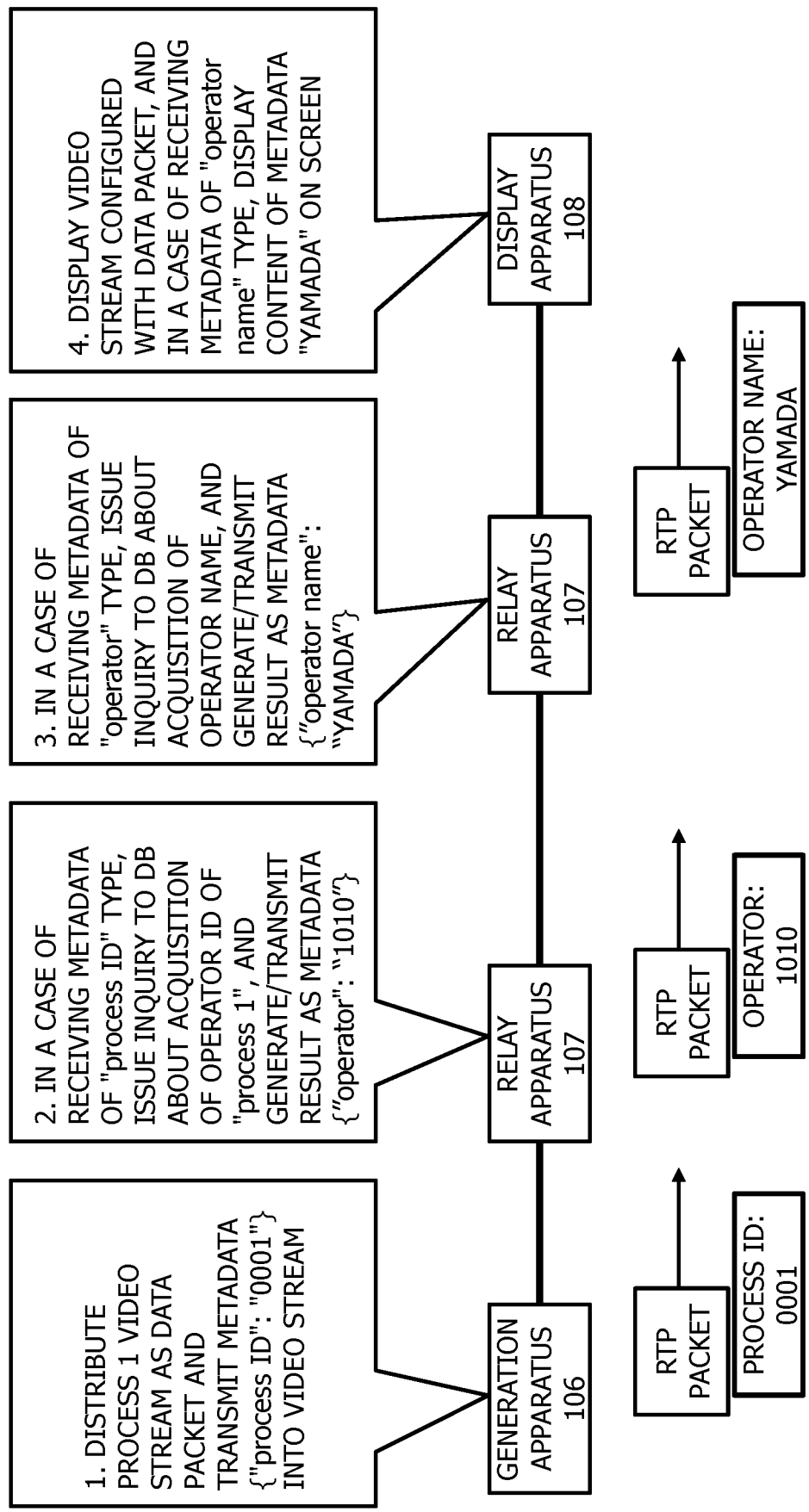
FIG. 9 is a diagram illustrating an example of adding metadata by a plurality of relay apparatuses according to the first embodiment.

FIG. 9 is a diagram illustrating an example in which the metadata is appropriately allocated to the data generated by the generation apparatus 106 and displayed on the display apparatus 108 by a series of operations performed by the generation apparatus 106, the relay apparatuses 107, and the display apparatus 108 described above.

The generation apparatus 106 distributes a video stream of the process 1 as a data packet and transmits the metadata {"process ID":"0001"} into the video stream.

In a case of receiving the metadata of the "process ID" type from the generation apparatus 106, the downstream relay apparatus 107 issues an inquiry to the DB of the retrieval destination 604 for acquiring the operator ID of the "process 1", generates a result of the inquiry as metadata {"operator":"1010"}, and transmits the metadata to the upstream relay apparatus 107.

In a case of receiving the metadata of the "operator" type from the downstream relay apparatus 107, the upstream relay apparatus 107 issues an inquiry to the DB of the retrieval destination 604 about acquisition of an operator name, generates a result of the inquiry as metadata {"operator name":"Yamada"}, and transmits the metadata to the display apparatus 108.

In a case of receiving the metadata containing the operator name: Yamada from the upstream relay apparatus 107, the display apparatus 108 displays the content "Yamada" together with a video stream on the display screen of the display apparatus 108 (refer to FIG. 2).

According to the embodiment described so far, the information stored in the association table 1031 and the design information given by the UI design function section 104 in the metadata visualization management apparatus 101 enable distribution of the metadata allocation procedure to the appropriate apparatuses, that is, the generation apparatus 106, the relay apparatuses 107, the display apparatus 108, and the like; thus, a user of the present system can easily construct the UI that utilizes the metadata.

In a case of occurrence of an acquisition source of the new metadata, describing presence of the source in the association table 1031 makes it possible utilize the data from the UI design function section 104. At this time, only the metadata allocation procedure using the related metadata may be described without describing all the procedures for generating the metadata; thus, it is possible to facilitate utilizing previous metadata allocation procedures.

Furthermore, the data transmission scheme and the metadata extraction/generation scheme can be described independently. While the example of storing the metadata in the RTP packet has been described in the present embodiment, the present invention can comply with other data transmission schemes by a method, for example, described below.

In a case of transmitting data using such structural data as XML (Extensible Markup Language) or JSON (JavaScript Object Notation) data, metadata can be added to part of the data. In this case, the relay apparatus 107 illustrated in FIG. 5 may handle the data as a packet containing the metadata irrespectively of the type of the packet and perform extraction and allocation of the metadata contained in the data written in XML or JSON.

Moreover, in a case of transmitting video data in a Motion JPEG format on an HTTP (Hyper-text Transfer Protocol), the metadata may be transmitted using a metadata region in each JPEG file configuring a video.

Second Embodiment

In a second embodiment, an example of not only displaying the data and the metadata but also providing an accumulation apparatus 1001 to persistently store the data and the metadata is illustrated.

Figure 10:
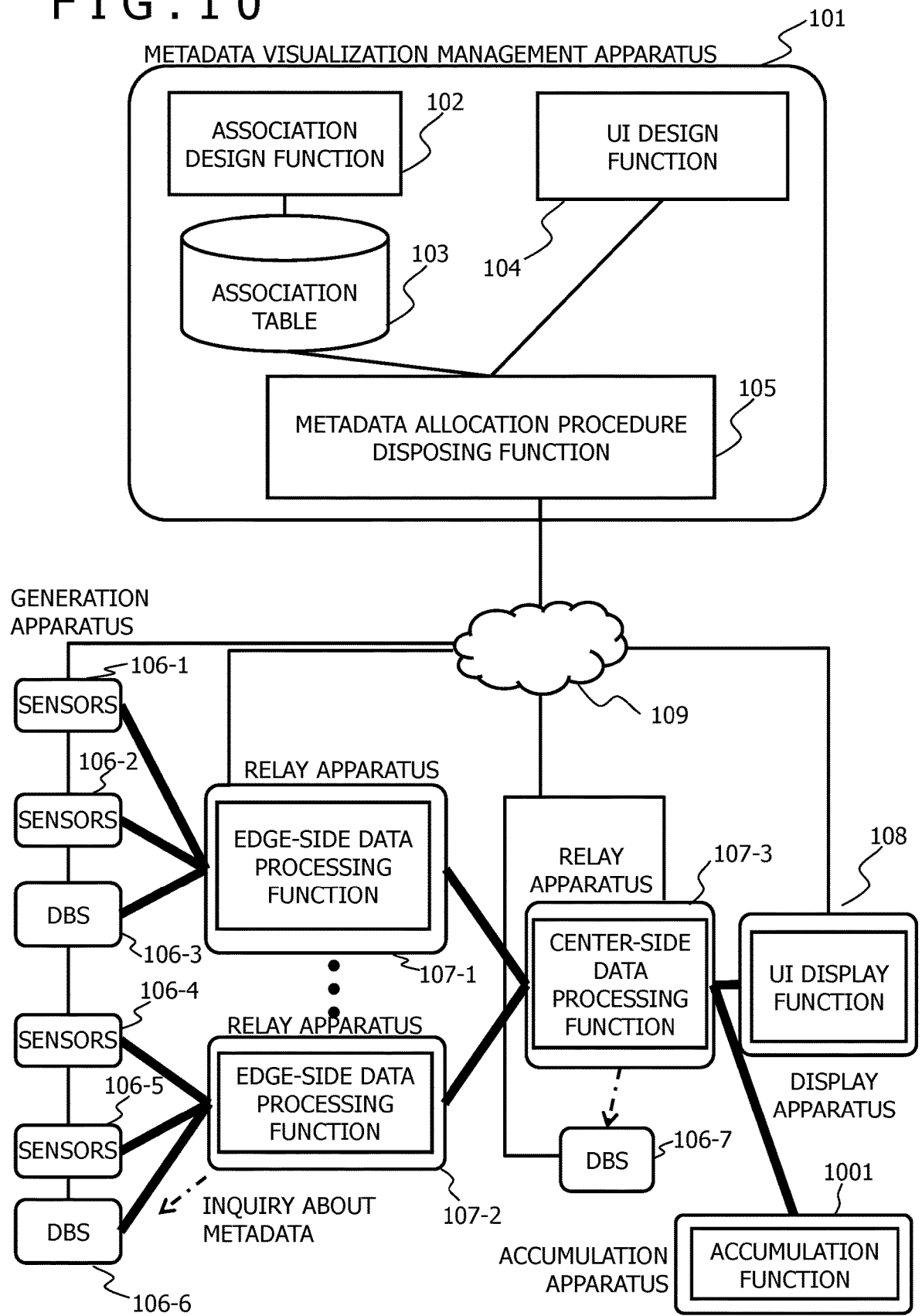
FIG. 10 is a block diagram illustrating an example of a configuration of a data collection system according to a second embodiment.

FIG. 10 is a block diagram illustrating an example of a configuration such that the accumulation apparatus 1001 is added to the data collection system of the first embodiment. A difference from the first embodiment is only connection of the accumulation apparatus 1001 to the system via the relay apparatus 107-3.

Figure 11:
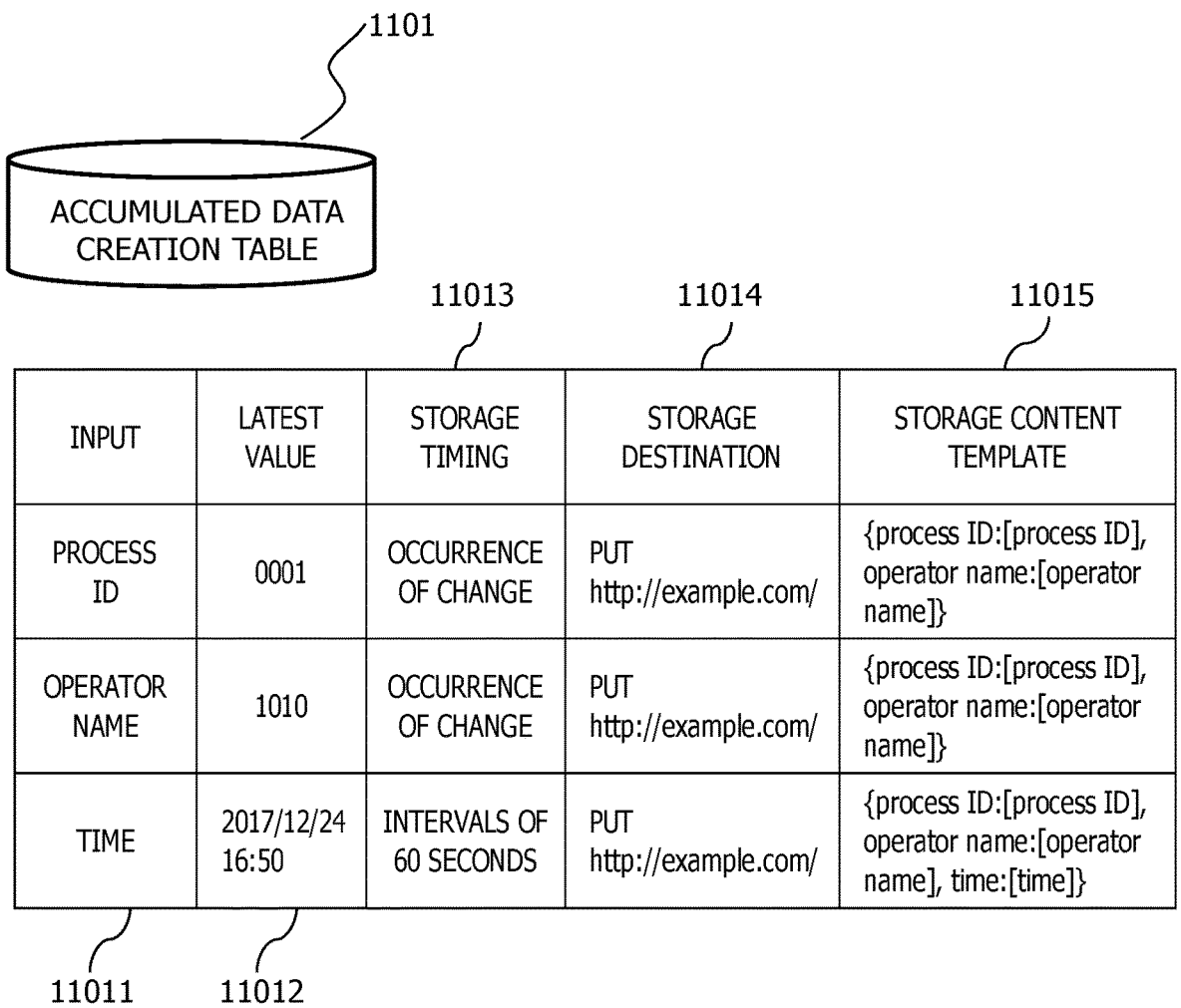
FIG. 11 is an accumulated data creation table illustrating an example of an accumulation procedure in an accumulation apparatus according to the second embodiment.

FIG. 11 is a diagram illustrating a data structure of an accumulated data creation table 1101 owned by the accumulation apparatus 1001.

When receiving a packet containing metadata, the accumulation apparatus 1001 searches a compatible entry by referring to a column of an input 11011 for each entry in the accumulated data creation table 1101.

In a case in which the compatible entry is present and in which a storage timing 11013 is compatible, the accumulation apparatus 1001 transmits a data storage request generated using a storage content template 11015 to a storage destination 11014.

Furthermore, the accumulation apparatus 1001 updates a latest value 11012 to a received value. Examples of the storage timing 11013 may include occurrence of a change from the latest value 11012, at constant intervals, and reception timing.

Disposing the accumulation apparatus 1001 makes the present system applicable even in a case of accumulation of necessary data for batch analysis or the like. In other words, it is possible to facilitate allocating the metadata to the data necessary for the analysis and expect improved analysis accuracy and the like.

According to the embodiment described so far, the procedures for creating information necessary for allocation of the metadata can be easily constructed on the basis of restrictions on a range of access to an object to be retrieved for the acquisition of the information and the like.

Furthermore, in the definition of the associations held by the management apparatus, both a procedure independent of a transfer scheme for the data and the metadata and a procedure dependent on the transfer scheme of the data and the metadata are described with respect to each of the metadata generation procedure and the metadata relay procedure. By doing so, even in a case of responding to a new transfer scheme, only a procedure dependent on the transfer scheme may be newly described; thus, it is possible to reduce time required for response.

Moreover, the management apparatus can expect the above effects by disposing the apparatus 1001 for accumulating data as an alternative to the display apparatus 108 of the system.

DESCRIPTION OF REFERENCE CHARACTERS

101: Metadata visualization management apparatus
102: Association design function section
103: Association table storage section
1031: Association table
104: UI design function section
105: Metadata allocation procedure disposing function section
106: Generation apparatus
107: Relay apparatus
108: Display apparatus
109: Management network
201: UI design screen
202: Display screen
601: Allocation procedure table
701: Metadata packet
702: Data packet
1001: Accumulation apparatus
1101: Accumulated data creation table

The invention claimed is:

1. A data collection system comprising:
a management apparatus that has an association design function to define and design association information between data and metadata, a design function to design a method of displaying the data and the metadata to be displayed on the data and related to the data, and a function to generate methods of transmitting, receiving, and relaying the data and the metadata from information given from the two design functions;
a generation apparatus that generates the data and the metadata;
a display apparatus that displays the data and the metadata; and
a relay apparatus that relays the data and the metadata, wherein
the association information is
information containing an input and an output for the metadata allocation procedure, a position of an apparatus which is an object to be retrieved and which can execute the metadata allocation procedure, a retrieval destination from which data is acquired in the metadata allocation procedure, an input template that indicates a procedure for extracting a necessary part from data used as the input for the metadata allocation procedure, an inquiry template that indicates a procedure for generating an inquiry at a time of inquiring of the retrieval destination, a reply template that indicates a procedure for extracting, from the retrieval destination, a necessary part from among a reply to the inquiry, and an output template that indicates a form of the new metadata from the input and the reply to the inquiry,
the management apparatus includes
a function to construct processing procedures, which include a generation procedure for generating the data and the metadata, a metadata allocation procedure for allocating the metadata to the data, a relay procedure for relaying the data and the metadata, and a display procedure for displaying the data and the metadata, and to distribute the generation procedure to one or more generation apparatuses, distribute the relay procedure to one or more relay apparatuses, and distribute the display procedure to one or more display apparatuses, in accordance with a position of the data and an acquisition method contained in the association information created using the association design function,
the generation apparatus includes
a function to transmit the data to the display apparatus via the relay apparatus on the basis of the generation procedure distributed from the management apparatus,
the relay apparatus includes
a function to inquire of the generation apparatus about the metadata on the basis of the relay procedure distributed from the management apparatus, using the data or the metadata received from the generation apparatus, and on the basis of an acquisition procedure contained in the relay procedure, and to generate new metadata, and
the display apparatus includes a function to display the data or the metadata received from the relay apparatus on the basis of the display procedure distributed from the management apparatus.

2. The data collection system according to claim 1, wherein the metadata allocation procedure contains an input that indicates a type of metadata which is an object in an entry out of the received metadata, a latest value of the metadata compatible with the input of the entry and received last, a retrieval destination that indicates a destination from which the data is acquired in the metadata allocation procedure, an input template that indicates the procedure for extracting the necessary part from the data used as the input for the metadata allocation procedure, an inquiry template that indicates the procedure for generating the inquiry at the time of inquiring of the retrieval destination, a reply template that indicates a procedure for inquiring of the retrieval destination on the basis of the inquiry template, and extracting the necessary part from the reply to the inquiry, and an output template that indicates the form of the newly generated metadata from the input and the reply to the inquiry.

3. The data collection system according to claim 1, wherein the data and the metadata are transmitted and received in different storage formats on the same stream.

4. The data collection system according to claim 1, further comprising an accumulation apparatus that accumulates the data and the metadata, wherein the management apparatus includes a function to distribute the processing procedures related to the data and the metadata to be displayed on the display apparatus to one or more of or all of the generation apparatus, the relay apparatus, and the accumulation apparatus, in accordance with the position of the data and the acquisition method contained in the association information created using the function to set and define the associations, and the accumulation apparatus includes a function to accumulate the data or the metadata received by way of the relay apparatus on the basis of the processing procedures including a metadata allocation procedure and distributed from the management apparatus.

5. A data collection system comprising:

a generation apparatus that generates data and metadata;

a display apparatus that displays the data and the metadata;

a relay apparatus that relays the data and the metadata transmitted from the generation apparatus to the display apparatus; and a data management apparatus that has a function to design and define associations between the data and the metadata, a function to design a method of designating and displaying the data and the metadata related to the data, and a function to generate processing procedures including methods of transmitting, receiving, and relaying the data and the metadata among the generation apparatus, the relay apparatus, and the display apparatus, wherein the association information is information containing an input and an output for the metadata allocation procedure, a position of an apparatus which is an object to be retrieved and which can execute the metadata allocation procedure, a retrieval destination from which data is acquired in the metadata allocation procedure, an input template that indicates a procedure for extracting a necessary part from data used as the input for the metadata allocation procedure, an inquiry template that indicates a procedure for generating an inquiry at a time of inquiring of the retrieval destination, a reply template that indicates a procedure for extracting, from the retrieval destination, a necessary part from among a reply to the inquiry, and an output template that indicates a form of the new metadata from the input and the reply to the inquiry, the data management apparatus includes a function to distribute the processing procedures related to the data and the metadata to be displayed on the display apparatus to one or more of or all of the generation apparatus, the relay apparatus, and an accumulation apparatus, in accordance with a position of the data and an acquisition method contained in association information created using the function to design and define the associations, the generation apparatus includes a function to associate the metadata with the data and to transmit the data and the metadata to the display apparatus via the relay apparatus, on the basis of the processing procedures distributed from the data management apparatus, the relay apparatus includes a function to inquire of the generation apparatus on the basis of the processing procedures distributed from the data management apparatus, using the received data or the received metadata, and on the basis of inquiry information contained in a relay procedure, and to generate new metadata, and the display apparatus includes a function to display the received data or the received metadata on the basis of the processing procedures distributed from the data management apparatus.

6. The data collection system according to claim 5, wherein the processing procedures include a display procedure for displaying the data and a metadata allocation procedure for allocating the metadata to the data.

7. The data collection system according to claim 5, wherein the data and the metadata are transmitted and received in different storage formats on the same stream.

8. The data collection system according to claim 5, further comprising an accumulation apparatus that accumulates the data and the metadata, wherein the data management apparatus includes a function to distribute the processing procedures related to the data and the metadata to be displayed on the display apparatus to one or more of or all of the generation apparatus, the relay apparatus, and the accumulation apparatus, in accordance with the position of the data and the acquisition method contained in the association information created using the function to set and define the associations, and the accumulation apparatus includes a function to accumulate the data or the metadata received by way of the relay apparatus on the basis of the processing procedures including a metadata allocation procedure and distributed from the management apparatus.

9. A data collection method in a data collection system, the data collection system including
   a management apparatus that has an association design function to define and design associations between data and metadata, a design function to design a method of displaying the data and the metadata to be displayed on the data and related to the data, and a function to generate methods of transmitting, receiving, and relaying the data and the metadata from information given from the two design functions; and
   a generation apparatus that generates the data and the metadata, a display apparatus that displays the data and the metadata, and a relay apparatus that relays the data and the metadata, the data collection method comprising:
   a step of causing the management apparatus to
   construct processing procedures, which include a generation procedure for generating the data and the metadata to be displayed on the display apparatus, a metadata allocation procedure for allocating the metadata to the data, a relay procedure for relaying the data and the metadata, and a display procedure for displaying the data and the metadata, and to distribute the generation procedure to one or more generation apparatuses, distribute the relay procedure to one or more relay apparatuses, and distribute the display procedure to one or more display apparatuses, in accordance with a position of the data and an acquisition method contained in the association information created using the association design function, wherein the association information is
information containing an input and an output for the metadata allocation procedure, a position of an apparatus which is an object to be retrieved and which can execute the metadata allocation procedure, a retrieval destination from which data is acquired in the metadata allocation procedure, an input template that indicates a procedure for extracting a necessary part from data used as the input for the metadata allocation procedure, an inquiry template that indicates a procedure for generating an inquiry at a time of inquiring of the retrieval destination, a reply template that indicates a procedure for extracting, from the retrieval destination, a necessary part from among a reply to the inquiry, and an output template that indicates a form of the new metadata from the input and the reply to the inquiry;
a step of causing the generation apparatus to
transmit the data to the display apparatus via the relay apparatus on the basis of the generation procedure distributed from the management apparatus;
a step of causing the relay apparatus to
inquire of the generation apparatus about the metadata on the basis of the relay procedure distributed from the management apparatus, using the data or the metadata received from the generation apparatus, and on the basis of an acquisition procedure contained in the relay procedure, and to generate new metadata; and
a step of causing the display apparatus to
display the data or the metadata received from the relay apparatus on the basis of the display procedure distributed from the management apparatus.

\* \* \* \* \*